(12) United States Patent
Boos, Jr.

(10) Patent No.: US 7,788,843 B2
(45) Date of Patent: Sep. 7, 2010

(54) SUBMERGIBLE CONTAINER WITH STREAMLINE SHAPE

(76) Inventor: Bernard Anthony Boos, Jr., 126 Lakota Island, P.O. Box 115, Big Stone City, ND (US) 57216

( * ) Notice: Subject to any disclaimer, the term of this patent is extended or adjusted under 35 U.S.C. 154(b) by 0 days.

(21) Appl. No.: 12/174,846

(22) Filed: Jul. 17, 2008

(65) Prior Publication Data

US 2009/0013919 A1      Jan. 15, 2009

Related U.S. Application Data

(63) Continuation of application No. 11/415,031, filed on May 1, 2006, now abandoned.

(51) Int. Cl.
*A01K 97/00* (2006.01)

(52) U.S. Cl. ............................... 43/55; 43/56

(58) Field of Classification Search .................. 43/55, 43/56
See application file for complete search history.

(56) References Cited

U.S. PATENT DOCUMENTS

| | | | | |
|---|---|---|---|---|
| 769,874 A | | 9/1904 | Paar | 43/56 |
| 1,385,792 A | * | 7/1921 | Petty | 43/55 |
| 1,942,756 A | * | 1/1934 | Howard | 43/56 |
| 2,057,055 A | * | 10/1936 | Pratt, Sr. | 43/55 |
| 2,644,269 A | * | 7/1953 | Ormesher | 43/55 |
| 2,717,469 A | * | 9/1955 | Piker et al. | 43/56 |
| 2,834,145 A | * | 5/1958 | Kisiel et al. | 43/56 |
| 2,974,437 A | * | 3/1961 | Stadler | 43/55 |
| 3,025,629 A | * | 3/1962 | Sears | 43/55 |
| 3,478,463 A | * | 11/1969 | Ruter | 43/55 |
| 3,513,584 A | * | 5/1970 | Donner | 43/56 |
| 3,717,124 A | | 2/1973 | Jacobs | 119/223 |
| 4,198,776 A | * | 4/1980 | Tomita | 43/56 |
| 4,627,189 A | | 12/1986 | Pippin et al. | 43/55 |
| 4,890,413 A | | 1/1990 | Nelson et al. | 43/55 |
| 4,903,429 A | * | 2/1990 | Tetenes | 43/44.99 |
| 5,507,113 A | * | 4/1996 | Keller | 43/55 |
| 5,529,204 A | | 6/1996 | Sykes | 43/55 |
| 6,076,298 A | * | 6/2000 | Teel | 43/54.1 |
| 6,421,951 B1 | * | 7/2002 | Kuhl | 43/56 |
| 6,584,727 B1 | | 7/2003 | De Shazer et al. | 43/55 |
| 6,662,488 B1 | | 12/2003 | Heimbrock et al. | 43/55 |

\* cited by examiner

*Primary Examiner*—Christopher P Ellis
(74) *Attorney, Agent, or Firm*—Westman, Champlin & Kelly, P.A.

(57) ABSTRACT

A submergible container that includes a plurality of fluid passages formed through a container body to allow a chamber of the container to fill when submerged in water to form a live well is described. In embodiments described, the container is formed of an oval or egg shaped body to provide a streamline contour for towing through the water. In an illustrated embodiment, the container includes a wheel assembly and pull handle to transport the container over the ground. The illustrated container includes a closure that is operable between an open position and a closed position to insert items into the container.

19 Claims, 11 Drawing Sheets

SUBMERGIBLE CONTAINER WITH STREAMLINE SHAPE

This is a Continuation of application Ser. No. 11/415,031, filed May 1, 2006 and entitled "SUBMERGIBLE CONTAINER WITH STREAMLINE SHAPE

BACKGROUND OF THE INVENTION

Fishing is enjoyed by both recreational fisherman and professional tournament fisherman. Tournament fisherman as well as recreational fisherman often wait until they have returned to the dock prior to releasing their fish. For example, tournament fishermen typically transport fish back to a dock or shore to weigh and measure the fish. After the fish are weighed and measured, fish can be released back into the water. Other fisherman typically transport fish back to the dock or shore to process or fillet the fish. The time period between when the fish is caught and when the fish is processed or released back into the water can spoil or harm the fish.

SUMMARY OF THE INVENTION

Embodiments described in the present application disclose a submergible container that includes a plurality of fluid passages formed through a container body to allow a chamber of the container to fill when submerged in water to form a live well. The live well has application for keeping game fish or larger fish.

In embodiments described, the container is formed of an oval shaped body to provide a streamline contour for towing through the water. In the illustrated embodiments, the container includes a wheel assembly and pull handle to transport the container over the ground. The illustrated container includes a closure that is operable between an open position and a closed position to insert items into the container.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

FIGS. 1-4 illustrate an embodiment of a submergible container 100 to store live fish (e.g. large size or game fish) or other items. The submergible container 100 shown includes a portage wheel assembly 101 for easy transport as described in greater detail herein. In the embodiment shown in FIG. 1, the container includes an oval shaped body 102 having an inner chamber 104 that is accessible through an access opening 110 formed in the body to insert and remove fish or other articles from the container. In illustrated embodiments, the opening is sized for insertion of large game fish.

Figure 1:
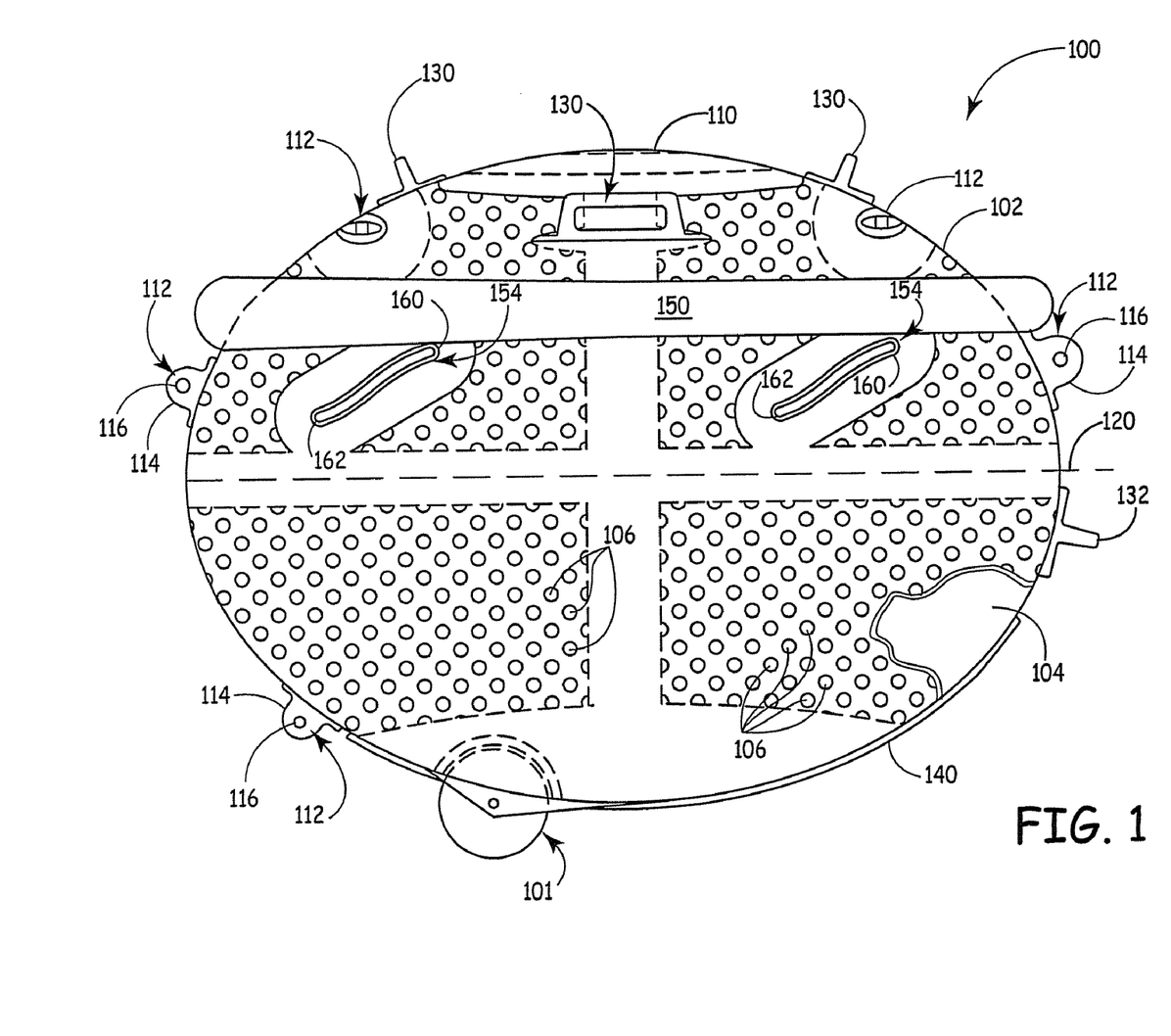
FIG. 1 is a side view illustration of an embodiment of a submergible container.

The body 102 includes a plurality of fluid passages 106 dispersed about an outer surface of the container body 102. The plurality of fluid passages 106 are formed through the body 102 and are opened to the inner chamber 104 to allow the chamber to fill with fluid when the container 100 is submerged. When the container is submerged, fluid or water flows through the fluid passages 106 to fill the inner chamber 104 thus forming a live well for fish or game. When the container 100 is raised out of the water, fluid drains from the chamber 104 through the fluid passages 106 to provide a lightweight container for storage or transport.

As shown, the container 100 includes one or more moorings 112 protruding from an outer surface of the container to secure the container to a boat, dock or other fixture. The one or more moorings 112 allow the container 100 to be attached to a dock or boat and submerged to keep fish alive for a period of time. As shown, the moorings 112 include a raised body portion 114 having a passage 116 extending therethrough. A hook or line is attached to the one or more moorings 112 through passage 116 to secure the container to a desired fixture.

In the illustrated embodiment, the container includes a tow mooring 112 (below float ring 150—described herein) forward of a center line dividing a forward and rear portion of the container and moorings 112 rear of the center line. The container also includes one or more moorings 112 on an upper surface of the container above a midline 120 of the container separating an upper portion and lower portion of the container as well as an anchor mooring 112 on a lower portion of the container body 102 that is used to attach an anchor line. Although FIGS. 1-4 cooperatively illustrate a particular number and arrangement of moorings 112, application is not limited to the particular placement, number or design shown.

As shown, the container 100 includes one or more handles to raise and lower the container into and out of the water and/or carry or transport the container. In the embodiment shown, the container includes lift handles 130 on an upper portion of the container to lift and/or carry the container 100. The container also includes pull handle 132. The pull handle 132 is located forward of the wheel assembly 101 and slightly below midline 120 to lift and cart the container along the ground or other surface. The user grasps the handle 132 to tip the container upward so that the tipped container is supported by the wheel assembly 101 to transport the container.

The submergible container 100 includes a skid plate 140 on a lower surface of the container. The skid plate 140 is formed of a lubricious or skid material, such as a nylon plastic, to allow the container to be slid along a dock or other surface as the container is pulled from the water. In the illustrated embodiment, the pull handle 132 is used to drag or slid the container along the skid plate 140 to pull the container from the water.

As described, fish or game are inserted into chamber 104 of the container through the access 110. In the embodiment illustrated in FIG. 1, the container includes a float device so that a portion of the submergible container 100 floats above a water line. In the illustrated embodiment, the access opening 110 is located on a top portion of the container body 102 and the float device includes a float ring 150 located between the top portion and midline 120 of the container body. The position of the float ring 150 maintains the access opening 110 above the water line while a remaining portion of the container is submerged.

In the embodiment shown, the float ring 150 protrudes from the container body and extends about an outer circumference of the container body 102. Although the float device in FIG. 1 includes a float ring 150, application is not limited to a float ring 150 and other float structures can be employed to restrict submersion of portions of the container as described herein.

Figure 2:
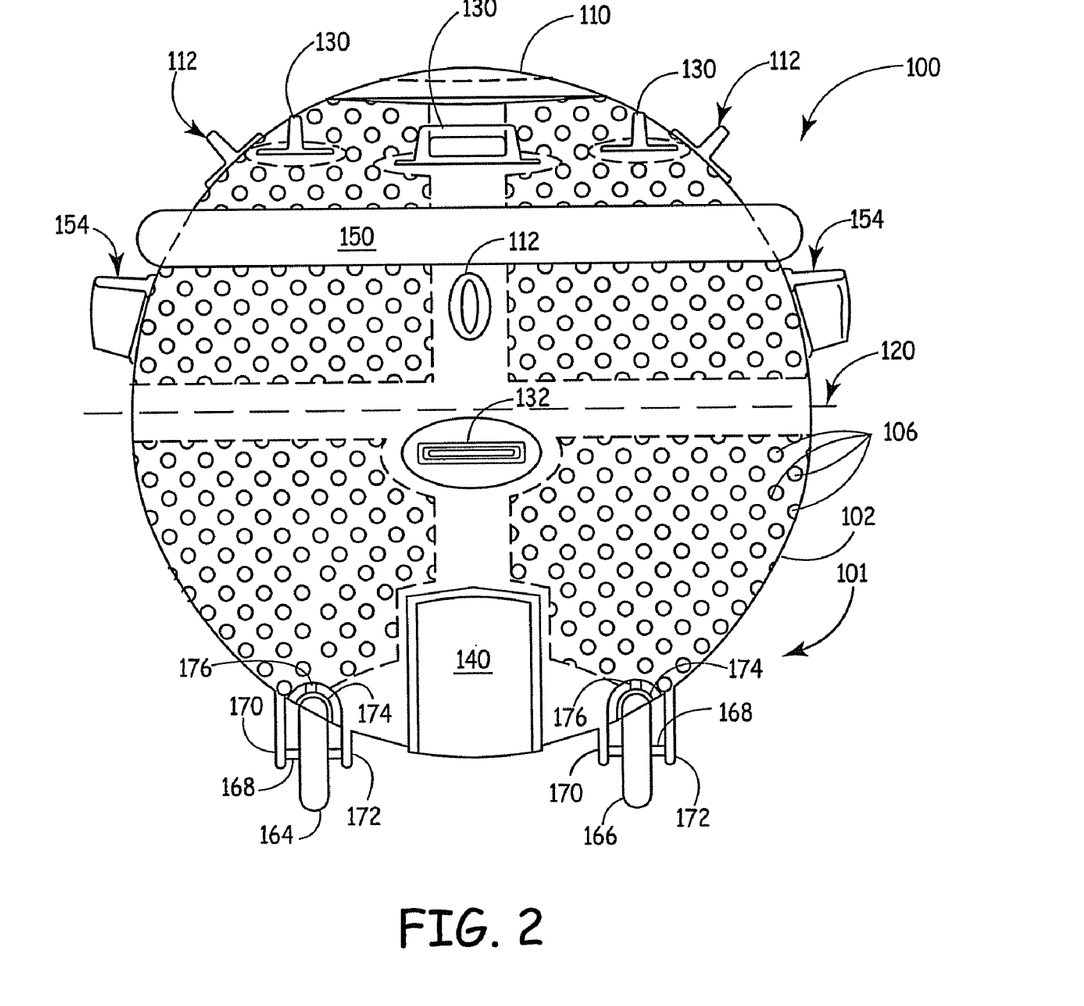
FIG. 2 is an end view illustration of the submergible container illustrated in FIG. 1.

As cooperatively shown in FIGS. 1-2, the illustrated container 100 also includes fins 154 protruding from the container body 102. In the illustrated embodiment, the container body includes forward and rear fins 154 on opposed portions of the container. To transport the container, a towline is attached to the forward mooring 112 to tow the container behind a watercraft or vessel. In the embodiment illustrated in FIGS. 1-4, the oval shape of the container body 102 provides a streamlined contour while fins 154 enhance stability and limit tipping. In particular, fins 154 are contoured to provide stability for the container when submerged and/or towed through the water.

In the embodiment shown, fins 154 include a leading edge 160, a trailing edge 162 and a wave like contour between the leading and trailing edges 160, 162. As shown, the leading edge 160 is raised relative to the trailing edge 162 to provide a downward slope between the leading edge 160 and the trailing edge 162 of the fin 154. In the illustrated embodiment, fins 154 are sloped at a 30-degree angle.

As previously described, when the container is withdrawn from the water, water drains from the chamber 104 and the container is transported using the wheel assembly 101. In the embodiment illustrated in FIGS. 2-3, the wheel assembly 101 includes spaced wheels 164, 166 on opposed sides of skid plate 140. Wheels 164, 166 are rotationally coupled to the container body through axle 168 extending between flanges 170, 172 on the container body. The wheels 164, 166 are supported in wheel wells 174 recessed from the outer surface of the container body. Drain holes 176 are formed proximate to the wheel wells 174 and are opened to the inner chamber 104 to facilitate fluid drainage from the chamber 104.

Figure 3:
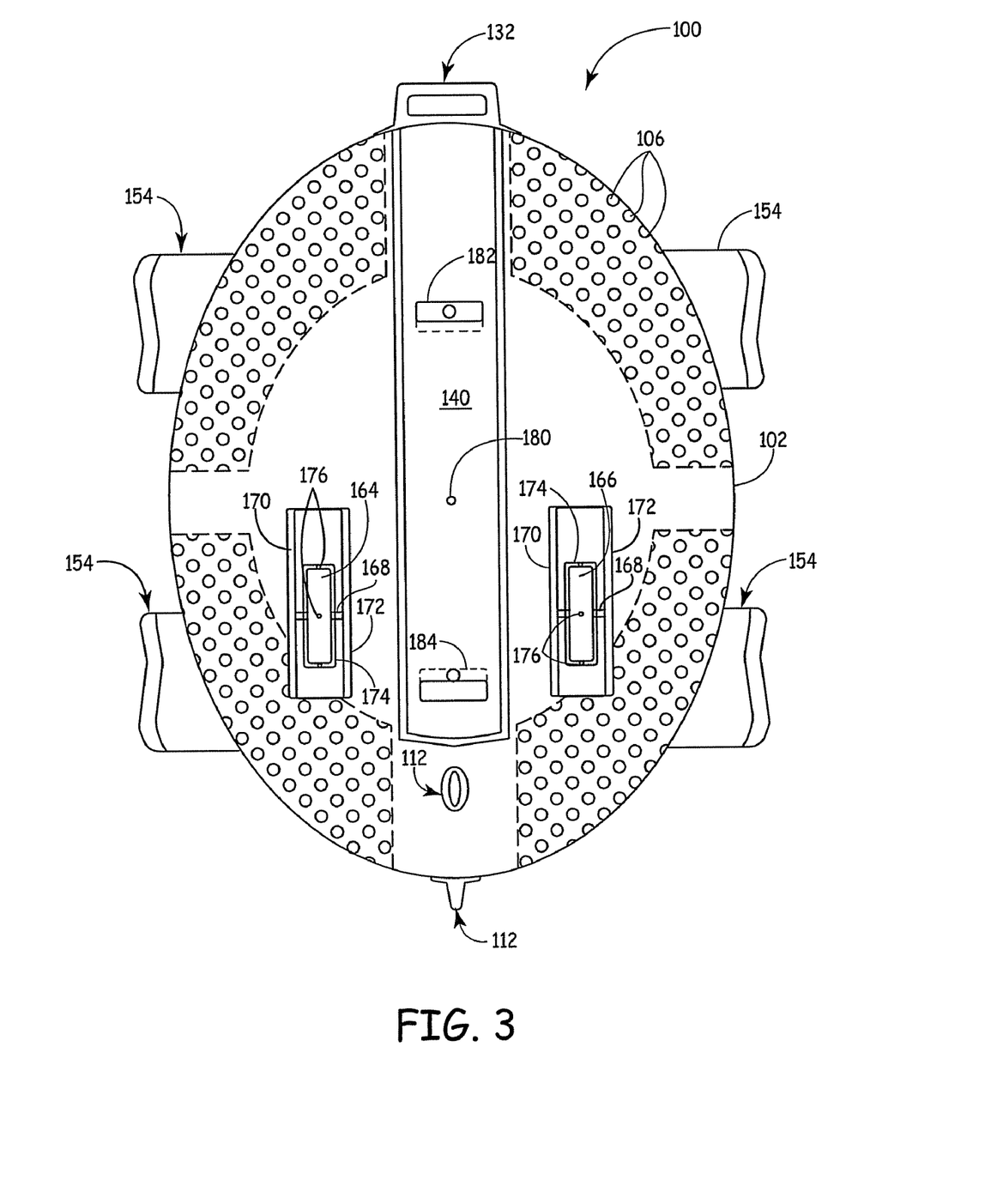
FIG. 3 is a bottom view illustration of the submergible container of FIG. 1.

As shown in FIG. 3, a bottom surface of the container 100 includes the anchor mooring 112 to anchor the container in the water. The bottom surface also includes a drain hole 180 formed through the skid plate 140 as well as lift grips 182, 184. To facilitate drainage a trough (not shown) can be molded on a bottom surface of the container body (in chamber 104) to direct fluid toward the drain hole 180. Lift grips 182, 184 are recessed from the outer surface of the container body and are contoured to allow a user to grab and lift a bottom portion of the container to dump content from the chamber 104.

Figure 4:
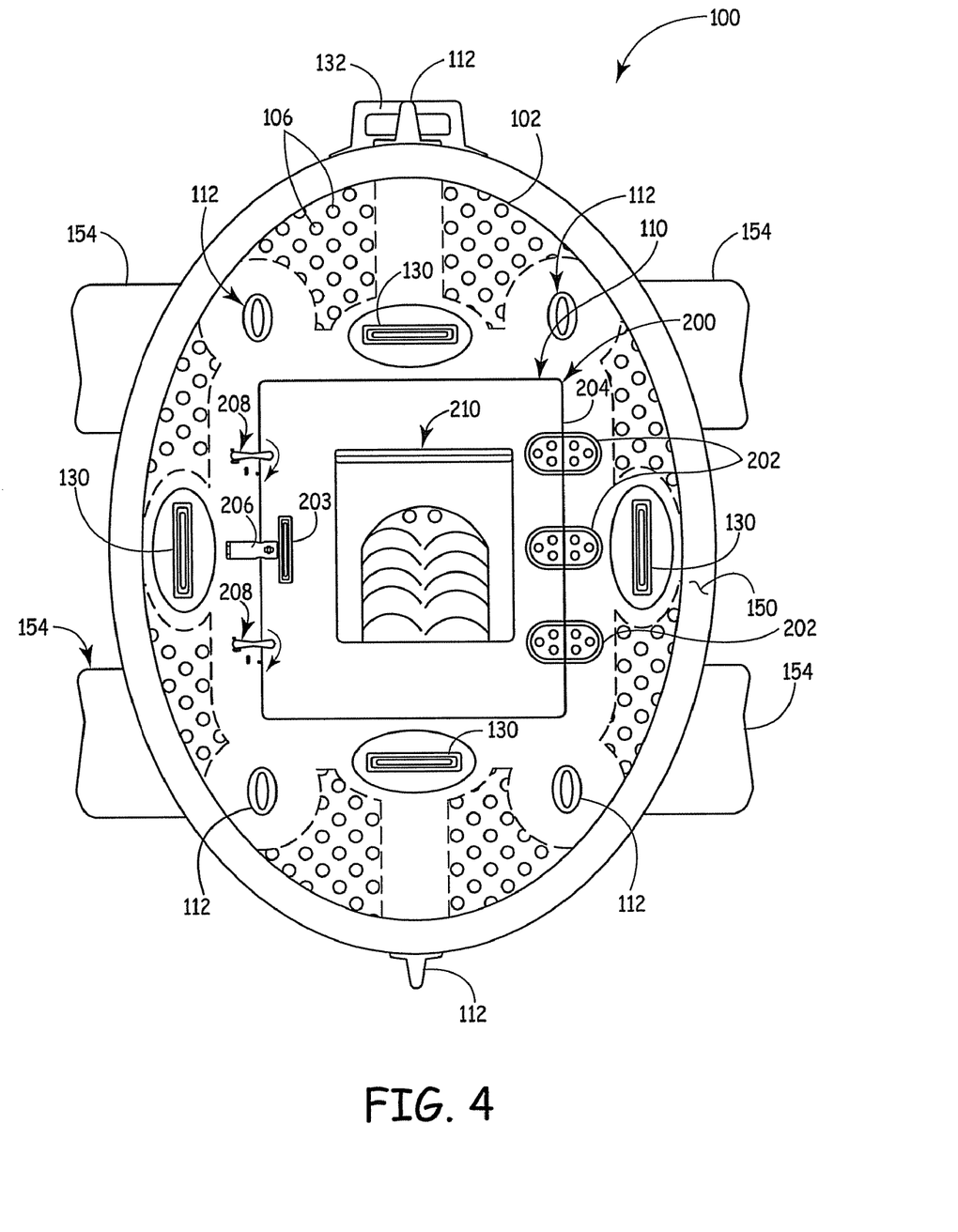
FIG. 4 is a top view illustration of the submergible container of FIG. 1.

As previously discussed, articles or fish are inserted into the container and removed from the container through access opening 110 on an upper portion of the container body. As illustrated in FIG. 4, the access opening 110 includes an opening in the container body and closure 200 that covers the opening in the container body. Closure 200 connects to the container body through hinges 202 so that in an open position, access is provided to chamber 104 through the opening in the container body. In a closed position, the closure 200 restricts access to the chamber 104. Closure 200 is opened and closed using handle 203 on closure 200.

As shown, hinges 202 connect closure 200 to the container body along seam 204. As shown, hinges 202 are recessed in indent 205 on the container body and closure 200 so that the hinges 202 are flush with an upper surface of the container body and closure 200 as shown in more detail in FIG. 5. In an illustrated embodiment, hinges 202 are nylon plastic hinges with nylon plastic rivets, although other non-corrosive hinges may be used to connect closure 200 to the container body 102.

Figure 5:
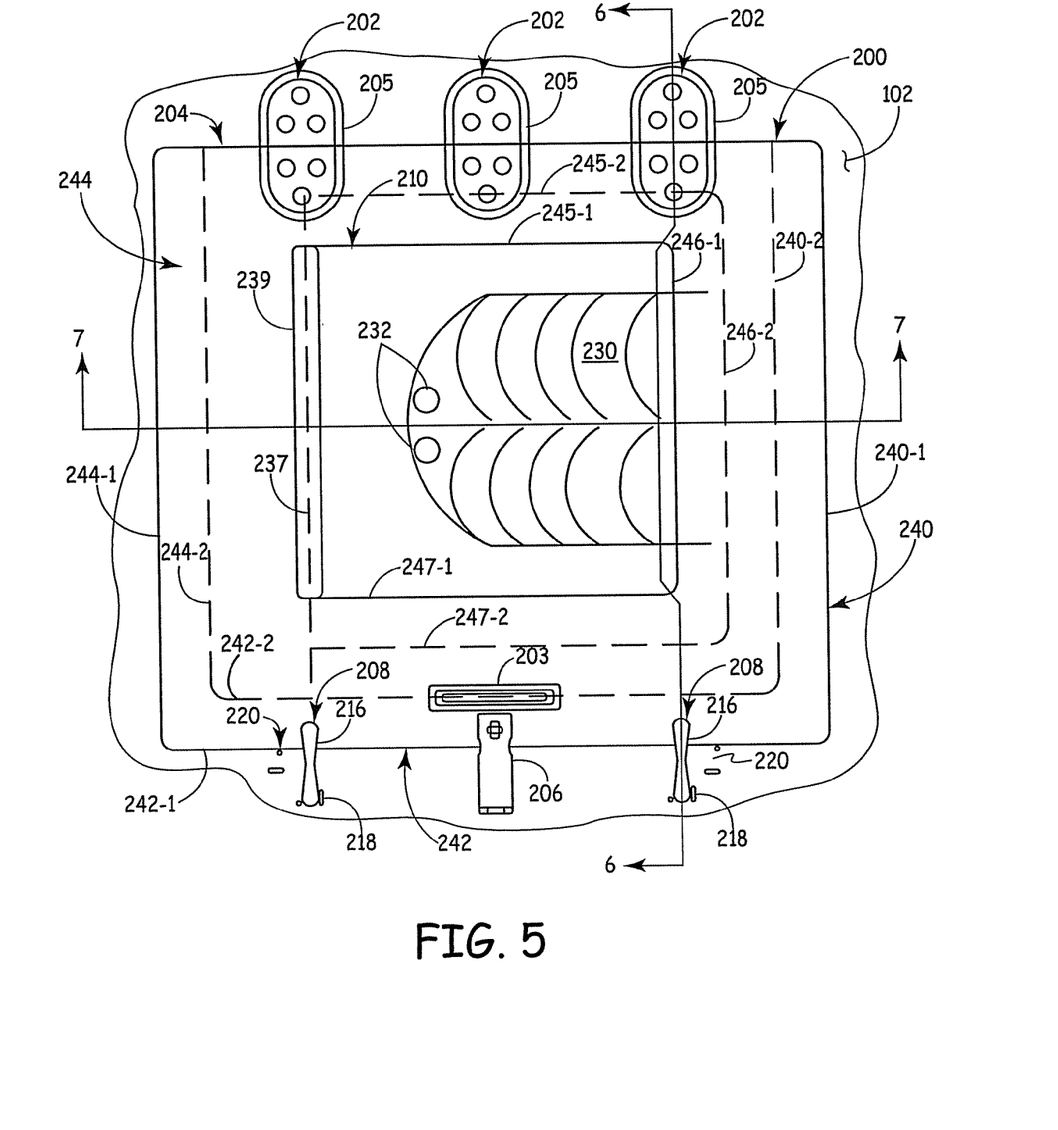
FIG. 5 is a detailed illustration of a closure assembly illustrated in FIG. 4.

As shown in FIGS. 4-5, closure 200 is locked in a closed position using a hasp latch 206 and butterfly latches 208. In the illustrated embodiment, butterfly latches 208 include a latch arm 216 and raised lock detents 218 and raised unlock detents 220 as shown more clearly in FIG. 5. Latch arm 216 is rotationally coupled to the container body 102 and rotates between an unlocked position and locked position (shown in FIGS. 4-5) defined by lock detents 218 and unlock detents 220, respectively. In the locked position, the arm 216 of the butterfly latch restricts rotation of the closure 200 so that the closure 200 will not open until the latch arm 216 is rotated to the unlocked position.

In the embodiment shown, the closure 200 includes a nested closure 210 which is opens to provide quick access to chamber 104 through an opening in the closure 200. Closure 200 pivots outwardly along seam 204 as illustrated by arrow 236 and closure 210 pivots inwardly along seam 237 as illustrated by arrow 238 in FIG. 6. As shown, a groove 239 is formed along the seam 237 between closure 200 and closure 210. Groove 239 is designed with sufficient depth and width to prevent fingers from being pinched when the closure 210 is opened and closed. As shown in FIG. 5, closure 210 includes a contoured recession 230 and finger holes 232 which are described in more detail herein. Closure 200 and 210 can be flat or rounded to conform to the oval shaped contour of the container body illustrated in FIGS. 1-4.

Figure 6:
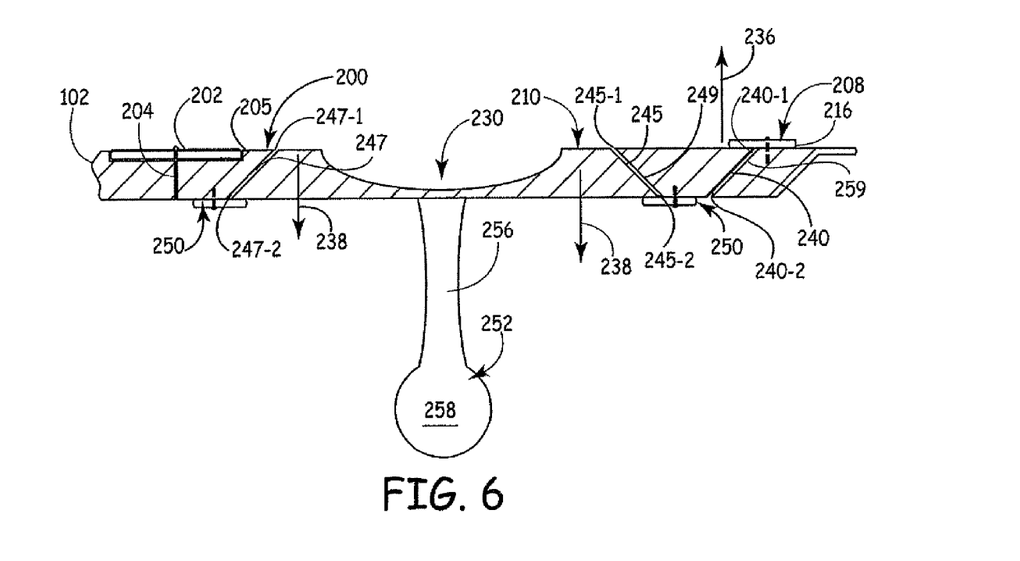
FIG. 6 is cross-sectional view taken along line 6-6 of FIG. 5.

As cooperatively shown in FIGS. 5-6, closure 200 includes inwardly tapered sides 240, 242, 244 that taper inwardly from outer edge 240-1, 242-1, 244-1 at an outer surface of the closure 200 to inward edge 240-2, 242-2, 244-2 at the inner surface of closure 200. Similarly closure 210 includes outwardly tapered sides 245, 246, 247 that taper outwardly from inner edge 245-1, 246-1, 247-1 at the outer surface of the closure 210, to outer edge 245-2, 246-2, 247-2 at the inner surface of closure 210. Sides 249 of the opening in closure 200 for closure 210 are tapered to interface with the tapered sides of closure 210 as shown in FIG. 6.

As shown in FIG. 6, latches 250 are connected to a lower or inner surface of closure 200 and are used to lock closure 210 relative to closures 200. In the locked position, closure 210 lifts integrally with closure 200 through handle 206 to open the container. Also, in the locked position, latches 250 do not permit closure 210 to open separately from closure 200. As shown, closure 210 is normally biased in a closed position via float assembly 252. In the embodiment illustrated in FIGS. 6-8, the float assembly 252 includes a float portion 258 and pedestal 256. The pedestal 256 supports the float portion 258 in the chamber to provide a buoyancy force to bias closure 210 in the normally closed position.

When the closure 210 is in the unlocked position (latches are opened) relative to closure 200, closure 210 opens when pressure is applied to closure 210 to access the inner chamber. As previously described, the tapered sides (i.e. three sides 240, 242, 244) of the closure 200 interface with the tapered sides 259 (which in the illustrated embodiment includes 3 sides) along the closure opening to limit downward movement of the closure 200 when pressure is supplied to closure 210 so that closure 210 opens separately from closure 200 for quick access. Although FIG. 5 illustrates tapered sides 240, 242, 244, the closure 200 and corresponding opening can be tapered along any one of or multiple sides.

Closure 210 opens outward or upwardly with closure 200 using finger holes 232 when latches 208 are in the unlocked position. The finger holes 232 are used to lift closure 210 which also lifts closure 200 due to the orientation of the tapered sides 245, 246, 247 on closure 210 and tapered sides 249 of the opening in closure 200. Thus, as described, closure 200 can be opened via finger holes 232 on closure 210 when latches 250 are in the unlocked position to allow the user to shift the latches 250 to the locked position. Similarly, the closure 210 and opening in closure 200 can have any one of or multiple tapered sides.

Figure 7:
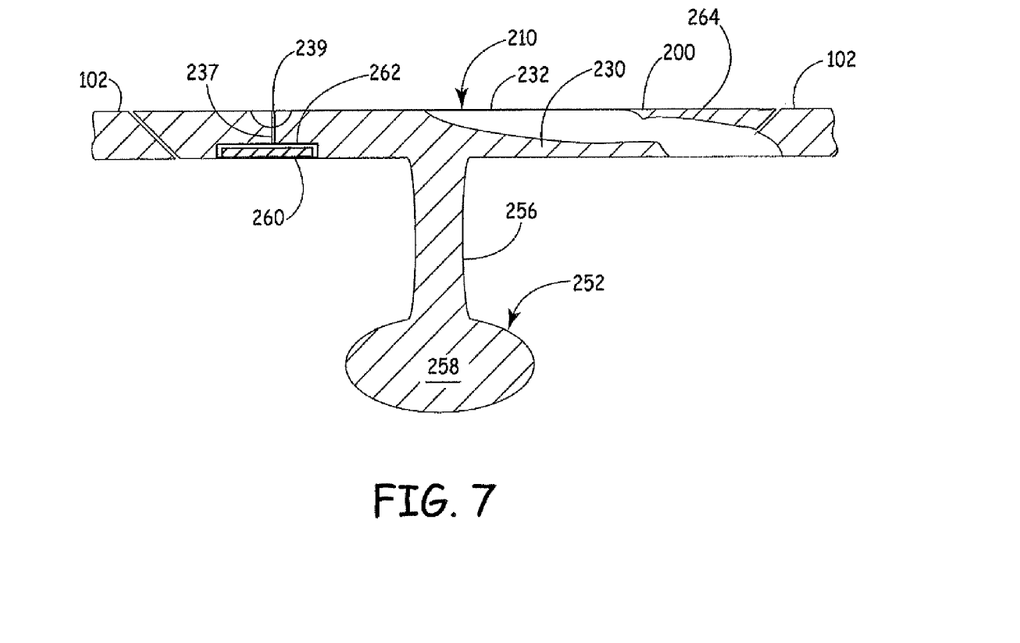
FIG. 7 is a cross-sectional view taken along line 7-7 of FIG. 5.
Figure 8:
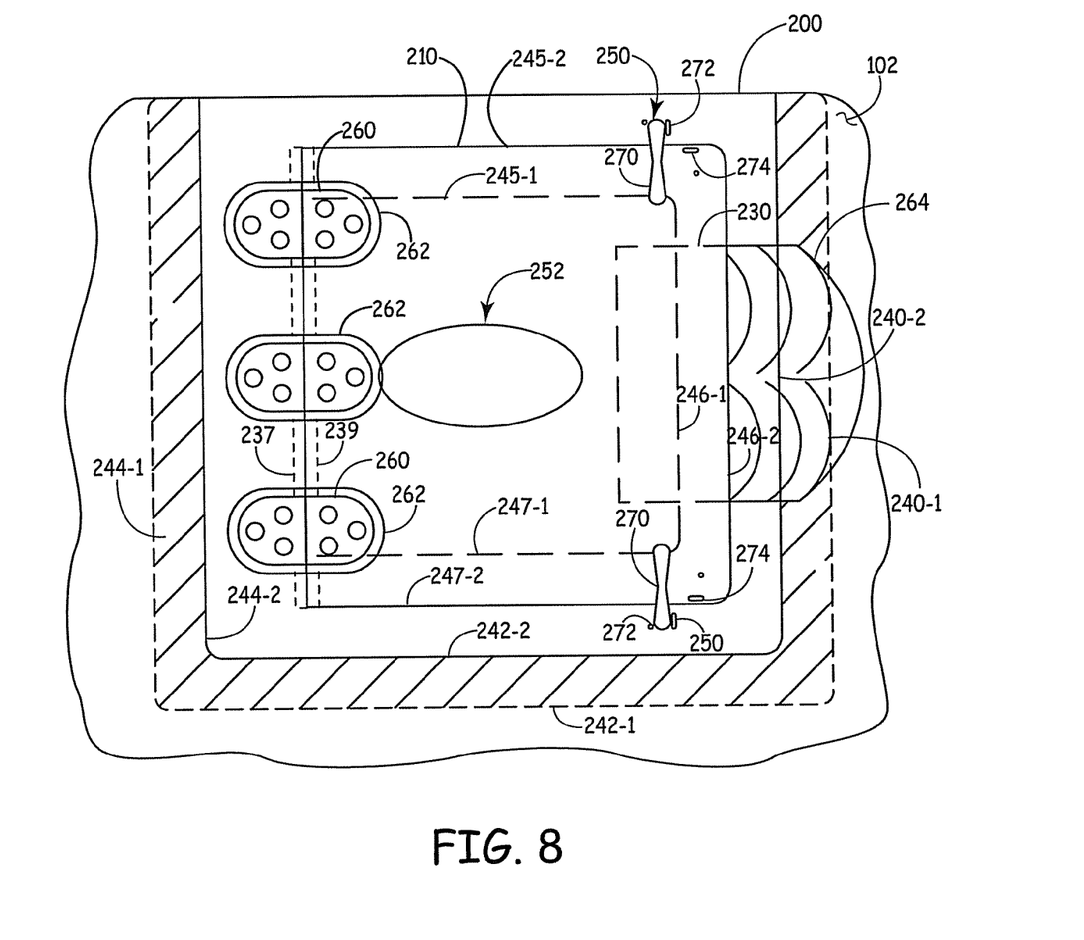
FIG. 8 is an illustration of an underside of the closure assembly illustrated in FIG. 5.

As shown, in FIGS. 7-8, closure 210 is hingedly connected to closure 200 via hinges 260 along seam 237. As previously described, hinges 260 are similarly formed of a nylon material. Hinges 260 are connected in indent 262 on a lower or inner surface of the closure 200 and closure 210 as previously described. As shown in detail in FIG. 7, the contoured recession 230 on closure 210 aligns with a recession 264 on an inner surface on closure 200 and the container body to form a slot for quickly inserting items into the chamber 104. As shown, the slot includes a smooth surface on recession 230 to easily slide item into the container 100.

Also as shown in more detail in FIG. 8, latches 250 similarly include latch arm 270 that is rotationally coupled to closure 210 (or alternately closure 200) and movable between locked detents 272 and unlock detents 274. In the locked position, the latch arm 270 is aligned relative to lock detents 272 (as shown in FIG. 8) to restrict movement of the closure 210 relative to closure 200. In the locked position, the closure 210 opens with closure 200 with handle 203. When closures 200 and 210 are opened latches can be unlocked to permit independent operation of closure 210. The latch arm 270 is rotated to the unlocked position relative to detents 274 so that closure 210 opens independently from closure 200 for quick insertion.

Figure 9:
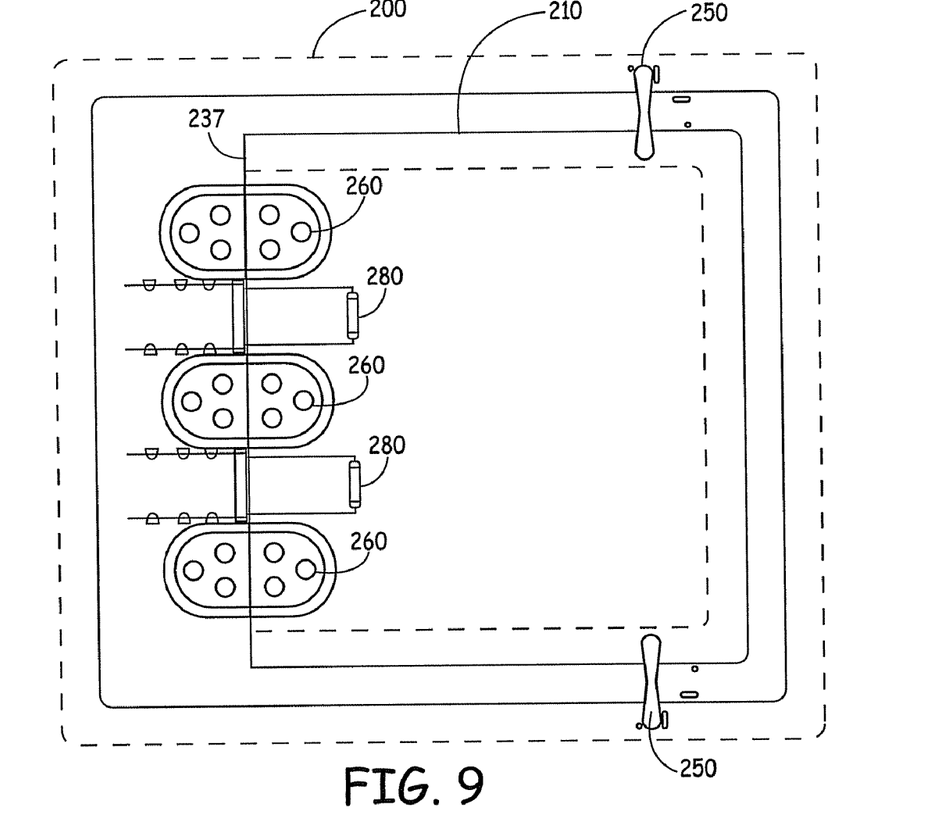
FIG. 9 is an illustration taken from an underside of an alternate embodiment of a closure assembly that includes a spring assembly.

FIG. 9 illustrates an alternate closure assembly wherein like numbers are used to refer to like parts in the previous FIGS. except that closure 210 is normally biased in a closed position via a spring assembly 280 in contrast to the float assembly illustrated in FIGS. 6-7. In FIG. 9, the spring assembly 280 is a tension spring and in FIGS. 10-11, the spring assembly 280 includes elongate flexible spring plate 290 having an elongate length extending between opposed first and second ends 292, 294 and a spring guide 296.

Figure 10:
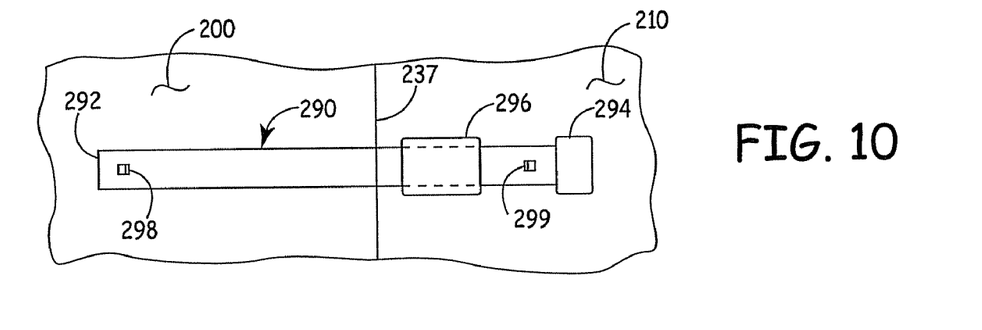
FIG. 10 is a top view illustration of an embodiment of a spring assembly for the closure assembly of the submergible container.
Figure 11:
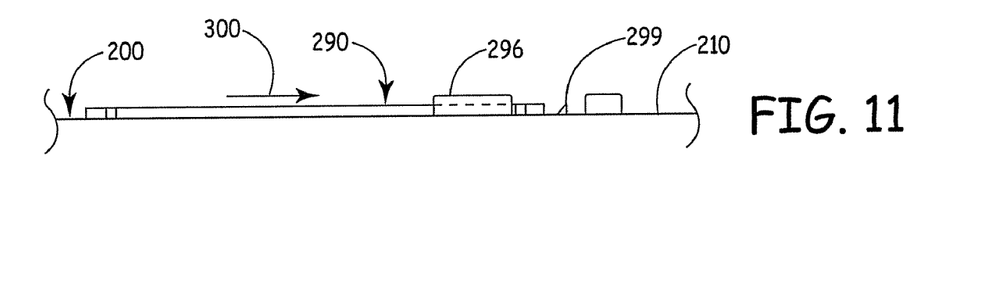
FIG. 11 is a side view illustration of the spring assembly of FIG. 10.

The first end 292 of the spring plate 290 is coupled to closure 200 at pin 298 and second end 294 of the spring plate 290 is coupled to the closure 210 at pin 299. An intermediate portion of the plate extends through a channel of guide 296 to secure the spring plate 292 relative to closures 200 and 210. The spring plate 290 is assembled by sliding plate 290 (as illustrated by arrow 300 in FIG. 11) through the channel of guide 296 and attaching pins 298, 299 through holes or openings in the plate 290. When inserted as shown, plate 290 abuts stop block 302. Once assembled, the elongate length of the plate extends across seam 237 so that flexure of the plate 290 supplies a biasing force to normally maintain the closure 210 in a closed position unless opened to insert a desired item into the container.

The container described is illustratively formed of a molded plastic container body 102, for example a nylon plastic or other material which resists heat and cold. In illustrative embodiments, the container body 102 includes an upper portion and a lower portion connected along a seam at midline 120 using plastic welding techniques. Example dimensions for the container body 102 include 4 feet long by 3 feet high, 3.5 feet long by 32 inches high, 3 feet long by 28 inches high and 2.5 feet long by 24 inches high. These are example dimensions and specific dimensions of the container body can be larger or smaller than the example dimensions.

In the embodiment shown in FIGS. 1-4, different portions of the container body have different wall thickness to provide structural rigidity. The locations and thickness of the reinforced areas is a matter of engineering design choice and is not limited to the embodiments shown. In an illustrative embodiment, areas of the container body having fluid passages 106 have one wall thickness while other portions of the container body have a larger wall thickness. In the illustrative embodiment, the thicker wall portions are provided along seams (or center or midlines) as well as top and bottom portions of the container body.

Figure 12:
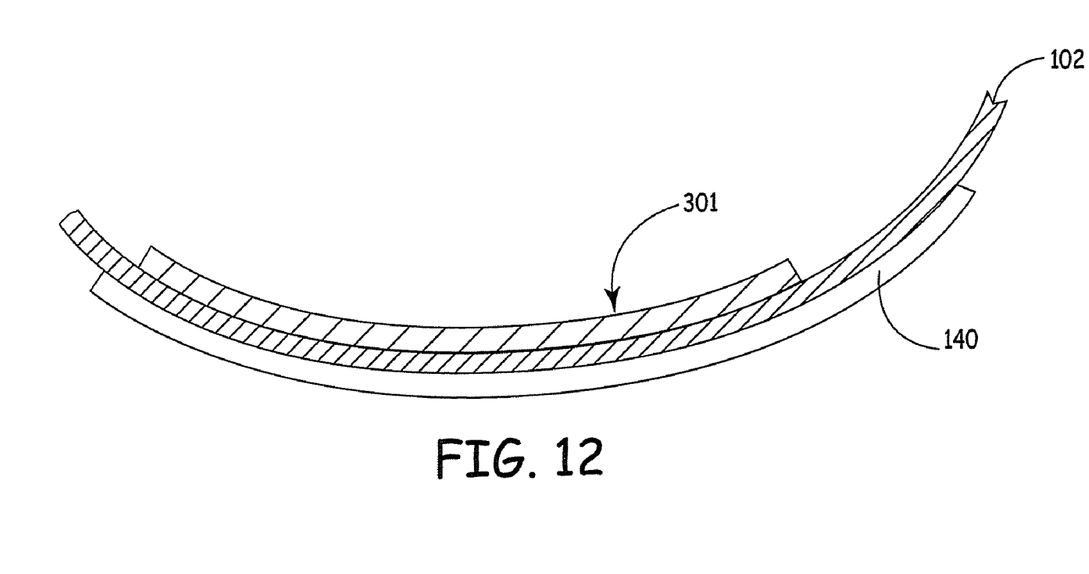
FIG. 12 illustrates a section of the container body including a reinforced layer to provide increased wall thickness for portions of the container body.

In addition, areas supporting handles 130, 132, moorings 112 and fins 154 and areas surrounding the closures 200, 210 also have the larger wall thickness. In an illustrative embodiment, the increased or larger wall thickness is formed by a reinforcement layer or portion 301 on an inner surface of the molded container body as shown in FIG. 12.

Figure 13:
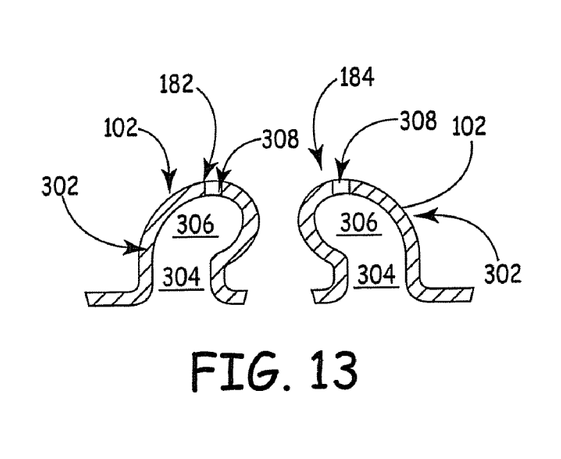
FIG. 13 is a detailed illustration of lift grips illustrated in FIG. 3.

FIG. 13 is a detailed illustration of an embodiment of the lift grips 182, 184 at the bottom of the container. As shown, lift grips 182, 184 include a contoured pocket 302 recessed from the outer surface of the container body 102. The contoured pocket 302 is contoured for insertion of a user's fingers and includes elongate portion 304 and a curved end portion 306. Also as shown, recessed surfaces of lift grips 182, 184 include fluid passages 308 for drainage through pockets 302.

Figure 14:
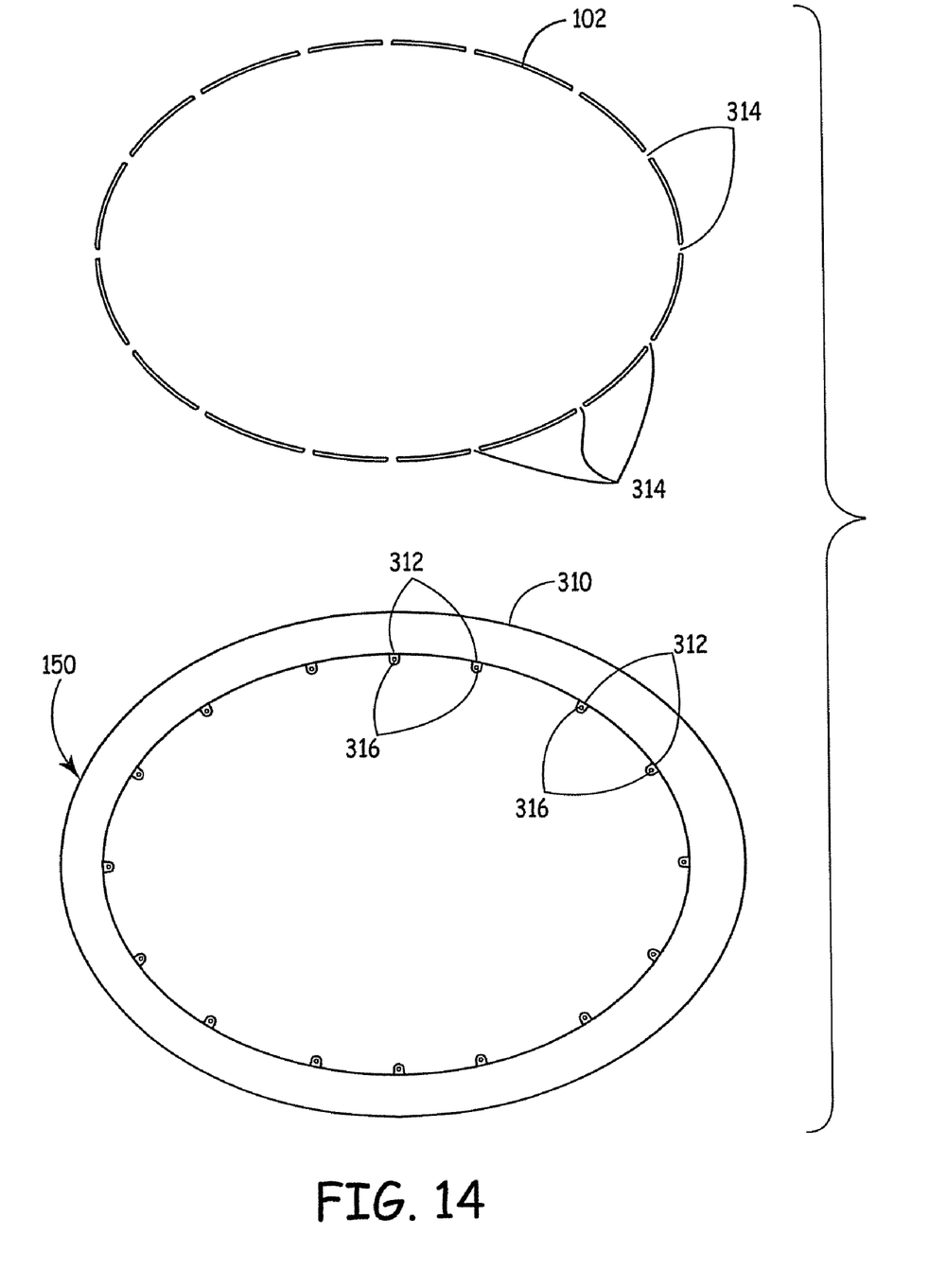
FIG. 14 is an exploded view of an embodiment of a float ring for the submergible container.

FIG. 14 illustrates detail embodiments for float ring 150. In the embodiment shown in FIG. 14, the float ring 150 has a ring shape body 310 formed of a buoyant material such as styrofoam. The ring shaped body 310 includes a plurality of tabs 312 spaced about an inner surface of the ring shaped body 310 to attach the float ring 150 to the container. Tabs 312 are shaped for insertion into spaced holes 314 about the outer circumference of the container body to snap fit to the container body 102.

Tabs 312 include openings 316 which in the embodiment shown are orientated generally horizontally. The openings 316 are sized to receive a line or tie (not shown) which is inserted through the openings 316 to secure or fasten the tabs 312 relative to an inner side of the container body to fix the float ring 150 to the container body 102. For example the tie or line can be formed of a nylon line or other material. Although in the illustrated embodiment, openings 316 are orientated horizontally, application is not limited to the particular orientation shown, for example the openings 316 can be orientated vertically to facilitate connection of the float ring 150 to the container body 102.

Application of illustrative embodiments is not limited to a single ring attached to the container body 102, for example, multiple float portions can be attached to the container body 102 to form a float ring. Furthermore, other float devices can be used to limit submersion of portions of the container body. For example, an air bladder or styrofoam fill or attachment can be incorporated in the top portion of the container body or closures 200, 210 to provide desired float.

Figure 15:
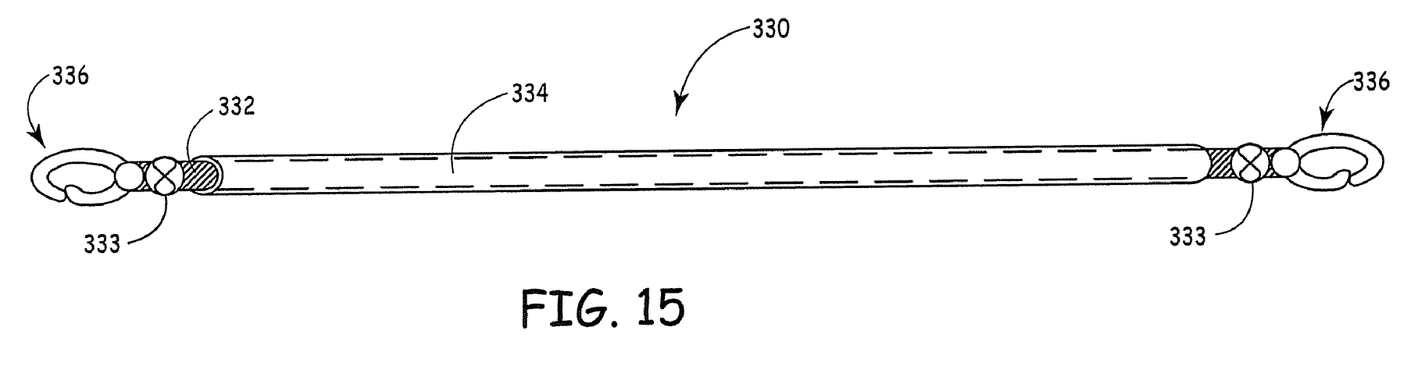
FIG. 15 illustrates a towline having application for towing the submergible container.

As previously described, the container can be towed by connecting a towline to moorings 112 on the container body 102. FIG. 15 illustrates an embodiment of a towline 330 that includes a flexible rope or line portion 332 enclosed within a rigid sleeve 334. Clips 336 are attached to opposed ends of the rope 332 (via knots 333 illustrated diagrammatically, or other attachments or adhesives) so that the towline can be connected to the container 100 and tow vehicle or dock. The rigid sleeve 334 maintains the line 330 so that it does not easily tangle or get caught in a boat propeller.

Although the present invention has been described with reference to preferred embodiments, workers skilled in the art will recognize that changes may be made in form and detail without departing from the spirit and scope of the invention and may have varied applications including application as a live well or as a storage container for storing line, rope, lift jackets or other items.

What is claimed is:

1. A submergible container comprising:
   a molded non-collapsible body having an oval shape including an opening to an inner chamber and a plurality of fluid passages dispersed about an outer surface of the oval shaped body and extending through the oval shaped body to the inner chamber;
   a closure operably connected to the oval shaped body proximate to the opening and the closure operable between a closed position and an opened position to insert or remove content from the inner chamber through the opening;
   a float device coupled to the oval shaped body;
   at least one wheel rotationally coupled to the oval shaped body;
   at least one pull handle protruding from an outer surface of the oval shaped body; and
   a skid plate having a lubricous surface extending along a bottom portion of the oval shaped body of the container wherein the skid plate forms an outer layer coextending along an inner layer of the bottom portion of the oval shaped body to form an outer lubricous surface of the container along the bottom portion of the container.

2. The submergible container of claim 1 and further comprising:
   at least one fin coupled to and extending from the oval shaped body and the at least one fin having a contoured body protruding outwardly from the oval shaped body.

3. The submergible container of claim 1 wherein the oval shaped body includes fins protruding outwardly from the oval shaped body on opposed portions of the oval shaped body.

4. The container of claim 1 and further comprising at least one mooring extending from the outer surface of the oval shaped body and having a contoured body raised from the outer surface of the oval shaped body and a mooring passage therethrough.

5. The container of claim 1 in combination with a tow line having a first end and a second end and a fastener at one of the first or second ends and the tow line including a flexible line portion and a generally rigid sleeve about the flexible line portion.

6. A submergible container comprising:
   an oval shaped body including a first opening to an inner chamber and a plurality of fluid passages dispersed about an outer surface of the oval shaped body and extending through the oval shaped body to the inner chamber;
   a first closure hingedly coupled to the oval shaped body proximate to the first opening and operable between an opened position and a closed position to insert and remove content from the inner chamber and the first closure including a second opening; and
   a second closure hingedly coupled to first closure proximate to the second opening and the second closure being operable between an opened position and a closed position; and
   wherein an outer surface of the second closure and an inner surface of the first closure include contoured recessions and the contoured recessions cooperatively form a slot between the first and second closures when the second closure is in the closed position and the slot having a width dimension and height dimension defined between the contoured recession on the outer surface of the second closure and the contoured recession on the inner surface of the first closure.

7. The container of claim 6 wherein the first closure is coupled to the oval shaped body to open outwardly and the second closure is coupled to the first closure to open inwardly and the first closure include at least one tapered side which interfaces with at least one tapered side of the first opening to limit inward movement of the first closure.

8. The container of claim 6 and comprising at least one latch on an inner surface of the first closure operable between a locked position and an unlocked position and in the locked position the latch restricting movement of the second closure relative to the first closure.

9. The container of claim 8 wherein the first closure is coupled to the oval shaped body and opens outwardly and the second closure is coupled to the first closure to open inwardly and in the locked position the at least one latch restricts inward movement of the second closure relative to the first closure and the second closure includes at least one tapered side which is orientated relative to a tapered side of the second opening to lift the first closure with the second closure.

10. The container of claim 1 wherein the opening of the body forms a first opening and the closure forms a first closure and the first closure is hingedly coupled to the body proximate to the first opening and operable between the opened position and the closed position and the first closure includes a second opening and comprising a second closure hingedly coupled to the first closure proximate to the second opening and the second closure being operable between an opened position and a closed position and wherein the float device coupled to the oval shaped body forms a first float device and comprising a second float device connected to the second closure.

11. A submergible container comprising:
   an oval shaped body including a first opening to an inner chamber and a plurality of fluid passages dispersed about an outer surface of the oval shaped body and extending through the oval shaped body to the inner chamber;
   a first float device coupled to the oval shaped body;
   a first closure hingedly coupled to the oval shaped body proximate to the first opening and operable between an opened position and a closed position and the first closure including a second opening;

a second closure hingedly coupled to first closure proximate to the second opening and the second closure being operable between an opened position and a closed position; and a second float device including a bulbous shaped portion coupled to the second closure via a pedestal that extends from an inner surface of the second closure and supports the bulbous shaped portion.

12. The submergible container of claim 6 wherein the oval shaped body includes a float ring protruding outwardly from the oval shaped body and extending about the oval shaped body.

13. The submergible container of claim 6 and comprising:
at least one wheel rotationally coupled to the oval shaped body; and
at least one pull handle protruding from the oval shaped body.

14. The submergible container of claim 1 wherein the body is egg shaped.

15. The submergible container of claim 1 wherein the opening forms a first opening and the closure forms a first closure and the first closure is hingedly coupled to the oval shaped body proximate to the first opening and operable between the opened position and the closed position and the first closure including a second opening and the container comprising:
a second closure hingedly coupled to the first closure proximate to the second opening and the second closure being operable between an opened position and a closed position; and
at least one latch on an inner surface of the first closure operable between a locked position and an unlocked position and in the locked position the at least one latch restricting inward movement of the second closure relative to the first closure.

16. The submergible container of claim 6 wherein the body is egg shaped.

17. The submergible container of claim 6 and comprising a first float device coupled to the oval shaped body and a second float device connected to the second closure.

18. The submergible container of claim 11 wherein the first float device comprises a float ring extending about a circumference of an upper portion of the oval shaped body.

19. The submergible container of claim 11 wherein the oval shaped body is egg shaped.

* * * * *